(12) United States Patent
Matsubara et al.

(10) Patent No.: US 7,094,492 B2
(45) Date of Patent: Aug. 22, 2006

(54) ELECTRODE FOR POLYMER ELECTROLYTE FUEL CELL

(75) Inventors: Takeshi Matsubara, Wako (JP); Katsuhiko Kohyama, Wako (JP); Hiroshi Shinkai, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 51 days.

(21) Appl. No.: 10/268,104

(22) Filed: Oct. 10, 2002

(65) Prior Publication Data

US 2003/0072991 A1    Apr. 17, 2003

(30) Foreign Application Priority Data

Oct. 11, 2001   (JP)   ............................. 2001-313826
Nov. 14, 2001   (JP)   ............................. 2001-349167

(51) Int. Cl.
   *H01M 4/86*   (2006.01)
   *H01M 4/96*   (2006.01)
   *C25B 11/04*  (2006.01)

(52) U.S. Cl. ..................... 429/40; 429/42; 429/44; 204/291; 204/284

(58) Field of Classification Search ............ 429/40, 429/41, 43, 42, 44; 204/282, 284, 288.2, 204/291, 294; 427/115, 384, 385.5; 252/182.1
See application file for complete search history.

(56) References Cited

U.S. PATENT DOCUMENTS

| | | | | |
|---|---|---|---|---|
| 3,930,094 A | * | 12/1975 | Sampson et al. | 442/365 |
| 5,998,057 A | * | 12/1999 | Koschany et al. | 429/42 |
| 6,007,934 A | * | 12/1999 | Auer et al. | 429/44 |
| 2002/0146615 A1 | * | 10/2002 | Yamaura et al. | 429/44 |

FOREIGN PATENT DOCUMENTS

| | | |
|---|---|---|
| JP | 3-25856 | 2/1991 |
| JP | 06-203840 | 7/1994 |
| JP | 06-203852 | 7/1994 |
| JP | 06-236762 | 8/1994 |
| JP | 07-176310 | 7/1995 |
| JP | 7-296818 | 11/1995 |
| JP | 07-296818 | * 11/1995 |
| JP | 7-326363 | 12/1995 |
| JP | 8-17440 | 1/1996 |
| JP | 08-180879 | 7/1996 |
| JP | 09-092293 | 4/1997 |
| JP | 09-199138 | 7/1997 |
| JP | 09-223503 | 8/1997 |
| JP | 10-003929 | 1/1998 |
| JP | 10-189005 | 7/1998 |
| JP | 10-189012 | 7/1998 |
| JP | 10-223233 | 8/1998 |
| JP | 11-329452 | 11/1999 |
| JP | 2000-353528 | * 12/2000 |
| JP | 2000-202970 A | 7/2001 |
| JP | 2003-115302 | 4/2003 |

* cited by examiner

*Primary Examiner*—Raymond Alejandro
(74) *Attorney, Agent, or Firm*—Arent Fox, PLLC.

(57) ABSTRACT

A polymer electrolyte fuel cell has a catalytic layer comprising a material and a polymer electrolyte, and the catalytic layer contains a fibrous material such as carbon whiskers or hydrophilic fibers. The polymer electrolyte fuel cell in the present invention having a catalytic layer comprising a catalytic material, an ion conducting material, an electron conducting material, and a void forming agent, and voids having diameters of from 60 to 1000 nm in the catalytic layer has a void volume of from 0.15 to 0.25 cm$^3$/g.

6 Claims, 5 Drawing Sheets

ELECTRODE FOR POLYMER ELECTROLYTE FUEL CELL

BACKGROUND OF THE INVENTION

1. Technical Field

The present invention relates to an electrode for polymer electrolyte fuel cells, and in particular, relates to a technology in which a catalytic layer functions efficiently.

2. Background Art

A polymer electrolyte fuel cell is formed by laminating separators at both sides of a tabular membrane electrode assembly (MEA). The membrane electrode assembly is typically a laminated body having a polymer electrolyte membrane placed between a cathode side catalytic layer and an anode side catalytic layer, and having a gas-diffusion layer laminated at the outside of each catalytic layer. This catalytic layer is formed by a method in which a catalyst paste is coated on an electrolyte membrane and these are hot pressed, or by a method in which a catalyst paste is coated on a carbon paper or FRP sheet to form an electrode sheet, which is hot pressed with an electrolyte membrane. The catalyst paste is composed of a catalytic material such as Pt, an electron conducting material such as carbon particles, and an ion conducting material such as polymer electrolyte. A bonding agent and a water-repelling agent such as PTFE (polytetrafluoroethylene) or PVDF (poly(vinylidene fluoride)) are added if necessary.

In such a fuel cell, a fuel gas (such as hydrogen) supplied through a separator plate arranged at the cathode side and an oxidizing gas (such as air) supplied through a separator plate arranged at the anode side are diffused through each gas-diffusion layer, and each gas reaches the catalytic layers. In the catalytic layer of the anode side, the fuel gas reacts and generates protons and electrons, and in the catalytic layer of the cathode side, protons, electrons, and oxidizing gas react and generate water, thereby generating electricity.

Therefore, it is necessary to supply fuel gas and oxidizing gas uniformly to the entirety of the catalytic layer to improve generation efficiency. The inventors further researched researching the voids in the catalytic layer functioning as gas channels, that is to say, the most suitable structure for the voids in the catalytic layer.

Japanese Unexamined Patent Application Publication No. 92293/97 discloses that voids having diameters of from 0.04 to 1.0 µm function as gas channels, and gas is adequately diffused if the specific volume of the voids is 0.04 cm$^3$/g or more. However, the void volume described above is controlled by the amount of the ion conducting material or the conditions of hot pressing. Therefore, the amount of the ion conducting material or the temperature and the pressure in the hot pressing process must be reduced to increase the voids (decrease the ion conducting channels), thereby causing deterioration in the adhesion between the membrane and the electrode. It is difficult to obtain a void density of 0.1 cm$^3$/g or more in this method.

In Japanese Unexamined Patent Application Publication No. 203840/94, an electrode, in which the porosity of the catalytic layer is 65 to 90 vol %, is disclosed. However, voids of this electrode are also controlled by conditions of hot pressing.

Furthermore, although the catalytic layer which is made by the process described above has voids to a certain extent before it is hot pressed, the voids are crushed and reduced after the hot pressing process, so that it is impossible to increase the voids to be more than that before the hot pressing process.

In order to solve this problem, Japanese Unexamined Patent Applications Publication No. 203852/94, No. 236762/94, No. 176310/95, No. 180879/96, No. 199138/97, No. 3929/98, No. 189005/98 and No. 189012/98 propose methods in which void forming agents such as zinc powder, silica sol, ammonium hydrocarbonate, camphor, lithium carbonate, or the like, are added to a catalyst paste, and are removed after the hot pressing process, thereby increasing the voids. However, these methods require a process to remove the void forming agent after the hot pressing process, and this causes a complicated production process.

Japanese Unexamined Patent Application Publication No. 223503/97 proposes a method in which voids are increased by adding a solvent having a high boiling point into a catalyst paste and evaporating the solvent in a sintering process. However, this method also requires an additional sintering process and also results in a complicated manufacturing process.

Furthermore, Japanese Unexamined Patent Application Publication No. 329452/99 proposes a method in which an ink (A) including an ion conducting material and an ink (B) including a solvent which does not exhibit ionomer lytic potential, such as methyl dodecate, are mixed to produce an ink (C), and after forming the catalytic layer by this ink (C), evaporating the solvent such as methyl dodecate, and thus the voids are increased. However, this method requires two kinds of inks and the atmosphere of the evaporating process must be strictly controlled.

Japanese Unexamined Patent Application Publication No. 223233/98 proposes a method in which carbon fibers are added to a catalyst paste so that the paste does not fill the voids of a porous substrate (gas-diffusion layer). However, this electrode is composed of a catalytic layer which is formed on the inside surface of a carbon paper, and this is different from the structure of the catalytic layer of the present invention which does not include carbon paper.

It is advantageous to reduce unnecessary material as much as possible to improve the generation efficiency of a polymer electrolyte fuel cell. PTFE and PVDF mentioned above are unnecessary from the viewpoint of power generation, and it is undesirable to add these materials. However, if these bonding agents are not added, the catalytic layer cannot maintain its structure by itself Furthermore, because the catalytic layer is a thin membrane and its bonding strength is low, cracks may occur and exfoliation of the catalytic layer and the substrate may occur during the manufacturing process even if the catalytic layer could maintain its structure.

Though much research has been performed thus far to improve generation efficiency per volume of catalytic layer, actually, a satisfying result has not yet been obtained. Therefore, an object of the present invention is to provide an electrode for polymer electrolyte fuel cells comprising the catalytic layer having a void structure exhibiting high generation efficiency without a complicated manufacturing process.

SUMMARY OF THE INVENTION

An object of the present invention is to provide an electrode for polymer electrolyte fuel cells in which the bonding strength of the catalytic layer is improved and the occurring of cracking is prevented by adding a small amount of a bonding agent, and as a result, the generation efficiency is improved. The bonding strength may also be improved without adding the bonding agent.

In a first aspect of the present invention, the polymer electrolyte fuel cell comprises a catalytic layer having a catalytic material and a polymer electrolyte, wherein a fibrous material is contained in the catalytic layer.

In the present invention, the bonding strength of the catalytic layer is improved without adding a bonding agent because the fibrous material functions as a bonding medium. Furthermore, during a manufacturing process when the catalytic paste is dried, cracking can be prevented by accommodating tensile stress generated by contracting. To prevent cracking from occurring during the drying process of the catalytic layer thus far, the amount of solvent must be reduced as much as possible in the case in which a bonding agent is not added. However, by adding the fibrous material of the present invention, the cracking is prevented, and there is no longer a constraint on the amount of solvent. Therefore, the degree of freedom of viscosity of the catalyst paste is increased, and in addition, a viscosity preparing process is no longer necessary and manufacturing efficiency is increased. Furthermore, because the fibrous material exists entangled in the catalytic layer, the voids are easily formed. These voids may remain even if the electrolyte membrane is pressed, functions as a channel of fuel gas, and results in higher generation efficiency.

It is advantageous that the catalytic layer include the fibrous material in a range of from 5 to 25% by weight because a content of less than 5% by weight causes disruption of each effect described above; for example, if the viscosity of the catalytic paste is too high, cracking may occur, and on the other hand, a content of more than 25% by weight causes a reduction in the number of points of catalytic reaction per volume and power generation efficiency.

As the fibrous material, fine carbon whiskers having electrical conductivity are advantageously used. The carbon whiskers twine around the catalytic material included in the catalytic layer and carbon particles having the catalytic material. Thus, a conductive path is newly formed in addition to the conductive path which consists of point contacts of the electron conducting material, and electrical conductivity in the catalytic layer is improved. It is possible to apply a platinum catalyst on the surface of the carbon whiskers to improve area density of the platinum catalyst of the electrode because the carbon whiskers are electrically conductive.

It is desirable that the catalytic layer have high electrical conductivity. However, the electrical conductivity only depends on the network of carbon particles carrying the catalyst, and research to improve the electrical conductivity has not so far been performed. As a method to improve the electrical conductivity, carbon particles having high electrical conductivity such as Ketienblack and Denkablack can be added. However, addition of these fine particles greatly reduces the bonding strength and cracking may easily occur during the drying process. Therefore, to prevent cracking from occurring, as described above, the bonding agent, which has nothing to do with the power generation, such as PTFE or PVDF, has been added thusfar. The catalytic layer usually has a thickness of from 10 to 20 µm, and it is therefore difficult to add a material which improves electrical conductivity, such as carbon fibers or metal particles, because these materials have diameters of about at least 10 µm. The carbon whiskers are a combined product of fine particles having a diameter of from 0.1 to 0.2 µm, and it is possible to add them to the catalytic layer as the electron conducting material. In addition, it has a relatively large aspect ratio of about 100 and is able to function as a bonding medium in catalytic materials, and this improves the bonding strength of the catalytic layer.

It is desirable that the fibrous material in the present invention be itself hydrophilic or have a hydrophilized surface. As described above, the fibrous material easily forms voids by being entangled in the catalytic layer, and these voids function as gas channels. In a cathode catalytic layer of fuel cells, water vapor is produced during power generation, and the water vapor is discharged through a gas-diffusion layer formed along a surface of a catalytic layer. When the water vapor condenses, the water blocks the gas channels and the flow of gas is extremely reduced. Therefore, if the fibrous material is itself hydrophilic or has a hydrophilized surface, the water produced from the water vapor spreads over the fibrous material by capillarity and no droplets are produced. Therefore, the area blocked by water is decreased and at the same time, the water migrates to drier parts, and thus, blocking of the gas channels is prevented. For example, the downstream of the gas channel readily experiences high humidity and the water vapor may easily condense; however, condensation is prevented in place such as this, and generation is difficult to block. Furthermore, the water immediately migrates from a place where water is in surplus to a place where water is in low supply by capillary. Thus, a shortage of water inside the electrode is automatically reduced, and as a result, voltage fluctuations depending on the level of humidity can be controlled.

To prevent blocking of the gas channels by condensed water as described above, it is also desirable to use fibrous material which is itself water repellent or has a water repellent surface in the present invention. The voids are easily formed because the fibrous material exists in the catalytic layer in an entangled state, and these voids function as the gas channels. In a cathode catalytic layer in a fuel cell, water vapor is produced during power generation, and the water vapor is discharged through a gas-diffusion layer formed along a surface of a catalytic layer, as described above. When the water vapor is condensed, the water blocks the gas channels and a flow of gas is extremely reduced. Therefore, if the fibrous material is itself water repellent or has a water repellent surface, condensation of water is prevented and permeability of the gas is maintained. If the content of the water repellent fibrous material is less than 5% by weight, the effect of the present invention is difficult to obtain, and if it is more than 10% by weight, the catalytic layer is too thick. Therefore, it is desirable that the water repellent fibrous material be contained in a range of from 5 to 10% by weight.

As the fibrous material of the present invention, it is also desirable to use an inorganic fiber such as alumina whiskers or silica whiskers, carbon fibers such as vapor grown carbon fibers, and polymer fibers such as those of nylon or polyimide. It is desirable that these fibrous materials have diameters of 1 µm or less, and it is more desirable that they have diameters of less than 0.3 µm.

In a second aspect of the present invention, an electrode of a polymer electrolyte fuel cell comprising a catalytic layer having a catalytic material, an ion conducting material, an electron conducting material, and a void forming agent, wherein the volume of the voids having diameters of from 60 to 1000 nm are in a range of from 0.15 to 0.25 cm$^3$/g in the catalytic layer.

In a porous catalytic layer having a large number of voids by the electron conducting material and the ion conducting material, the catalytic material is held on a surface of the electron conducting material or is diffused in the ion conducting material, or includes both these structures.

In the present invention, when processing the structure as described above, the volume of the voids having diameters of from 60 to 1000 nm can be made to be in a range of from 0.15 to 0.25 cm$^3$/g by using a specific void forming agent, the catalytic layer has voids which function as good gas channels, and high power generation efficiency is achieved. Furthermore, it is more advantageous that the specific volume of the voids described above be from 0.17 to 0.22 cm$^3$/g.

It is desirable that the void forming agent in the present invention be a fine fibrous material having diameters of 0.4 μm or less. By adding the fine fibrous material into the catalytic paste as the void forming agent, the fibrous material acts as pillars which support the load under pressing processing. Therefore, an excessive load on the carbon and the solid polymer electrolyte is reduced and the gas channels are maintained. As a result, the generation efficiency is improved. Furthermore, as another advantage of the fibrous material, the porosity of the catalytic layer after the pressing process can be controlled depending on the amount of the fibrous material added.

In the present invention, the catalytic layer is formed by allowing the fibrous material to remain in the catalytic layer, and it is unnecessary to remove the void forming agent. Therefore, an electrode for a polymer electrolyte fuel cell exhibiting high generation efficiency can be produced with a simplified process.

As the fibrous material described above, inorganic fibers such as alumina whiskers or silica whiskers, carbon fibers such as a vapor grown carbon fibers (carbon whisker), and polymer fibers such as those of nylon or polyimide can be used. Among these materials, in particular, carbon whiskers which are fine and electrically conductive may be advantageously used.

Also, it is advantageous that the fibrous material in the present invention be itself water repellent or have a water repellent surface for the reasons mentioned above. If the fibrous material is itself water repellent or has a water repellent surface, condensation of water is prevented, blocking of the gas channels (void) is also prevented, and permeability to gas is maintained.

Furthermore, it is also advantageous that the fibrous material be itself hydrophilic or have a hydrophilized surface in the present invention from the viewpoint of preventing gas channels from being blocked by water. With this form, water produced from the water vapor is spread over the fibrous material by capillary action and no droplets are produced. Therefore, an area blocked by water is decreased and at the same time, the water migrates to a drier parts, and thus blocking of gas channels is prevented. Furthermore, the water immediately migrates from places where water is in surplus to places where water is in short supply by capillary action. Thus, a shortage of water inside the electrode is automatically reduced, and as a result, voltage fluctuations depending on the level of humidity can be controlled.

It is advantageous that the catalytic layer include the fibrous material in a range of from 5 to 25% by weight because a content of less than 5% by weight causes a disruption of each of the effects described above. On the other hand, a content of more than 25% by weight causes a reduction in the number of places of catalytic reaction per volume and a reduction in power generation efficiency.

In the present invention, carbon black particles can be used as the electron conducting material, a platinum group metal such as Pt or Pd can be used as the catalytic material, and fluororesin based ion-exchange resin can be used as the ion conducting material.

It is advantageous that the catalytic material which is diffused into the ion conducting material be smaller than the catalytic material carried by the electron conducting material. That is to say, by diffusing smaller catalytic material into the ion conducting material, points which energizes the fuel gas increase and the ratio of the catalytic material utilization is improved. It is advantageous that the mean particle diameter of the catalytic material diffused into the ion conducting material be in a range of from 0.5 to 5 nm, and more advantageously, in a range of from 1 to 3 nm. Also, it is advantageous that the mean particle diameter of the catalytic material carried by the electron conducting material be in a range of from 1 to 8 nm, and more advantageously in a range of from 3 to 5 nm.

It is advantageous that the amount of the catalytic material which is diffused into the ion conducting material be in a range of from 1 to 80% of the entirety of the catalytic material by weight. In a case in which the amount of this catalytic material is less than 1% by weight, activation overvoltage is increased and a voltage which is utilized is decreased. Furthermore, as a result, it is no longer favorable compared to a case of supplying the catalytic material only by a catalyst supporting material powder. On the other hand, if the amount of the catalytic material diffused into the ion conducting material is more than 80% by weight, most catalytic material must be diffused into the ion conducting material, and it is difficult to hold the catalytic material required for power generation from the viewpoint of durability. For example, in the case in which the catalytic material is introduced only by substitution or reduction of catalyst ions, the amount of the catalytic material is decided by ion exchange capacity of the ion conducting material. To increase the catalytic material, substitution or reduction must be repeated or the amount of the ion conducting material must be increased. However, the former may cause growth of particle size of the catalytic material, and the latter may cause reduction of gas diffusion in the electrode. Therefore, it is advantageous that the amount of the catalytic material diffused into the ion conducting material be in a range of from 3 to 50% by weight, and more favorably in a range of from 3 to 20% by weight. By increasing the amount of catalytic material held by the electron conducting material, the catalytic material can be arranged around a contact surface between the ion conducting material and the electron conducting material, and the ratio of the catalyst utilization can be increased. Furthermore, an effective electrically conductive network can be constructed by diffusing the catalytic material uniformly into the ion conducting material.

It is advantageous that a weight ratio of the ion conducting material to the electron conducting material be less than 1.2. Porosity is increased and gas diffusion is improved if the amount of the ion conducting material is small; on the other hand, the electron conducting material which is holding Pt is not the sufficiently covered, points which energize the fuel gas are decreased, and the ratio of the catalytic material utilization is reduced.

The electrode for the polymer electrolyte fuel cell in the present invention is produced as explained next. First, the electron conducting material whose surface is formed by the catalytic material or the electron conducting material itself, the ion conducting material, and the void forming agent are mixed together. This mixture is processed by a solution including the catalytic material and is ion substituted. For example, in the case in which the ion conducting material has a sulfo group, the proton of the sulfo group is substituted by a cation included in the catalytic material. Next, by exposing the mixture product after ion substitution under a reducing atmosphere, a catalytic paste wherein the fine catalytic material is diffused into the ion conducing material is obtained.

There are two kinds of reducing methods. One is a gas phase method using a gas such as hydrogen or carbon monoxide, the other is a liquid phase method using a liquid such as $NaBH_4$, formaldehyde, glucose, or hydrazine. In the present invention, both methods can be used, but the liquid phase method is more suitable because all of catalyst metal ions in the ion conducting material are reduced and the catalytic material is diffused uniformly into the ion conducting material under the liquid phase method.

This catalytic paste can be ion substituted as described above after being formed into sheet. Alternatively, after making the catalytic paste, it can be dried and ground, and after ion substitution and reduction in a pulverized condition, be processed into paste state and formed into a sheet. There are some methods already known for forming into a sheet, such as to peel a film after forming a membrane electrode complex by covering the film with the catalytic paste, or to cover a carbon paper or a electrolyte membrane with a catalytic paste.

In the case un which Pt is used as the catalytic metal, a solution including, for example, $Pt(NH_3)_4(OH)_2$, $Pt(NH_3)_4Cl_2$, or $PtCl_4$ can be used for ion substitution. Furthermore, as a catalyst metal ion which is ion substituted, in addition to a metal ion itself such as $Pt^+$, a complex ion such as $Pt(NH_3)_4^{2+}$ can be used. It is also possible to diffuse the catalytic material into the ion conducting material without the ion substitution process. For example, $Pt(NH_3)_2(NO_2)_2$, $H_2PtCl_6$, $H_2Pt(OH)_6$, or the like is mixed with the ion conducting material, and by reducing the catalyst metal ion, a polymer electrolyte including a catalyst can be produced. A catalyst metal ion means not only the catalyst metal ion itself, but also an ion including a catalytic material such as a complex ion.

BRIEF DESCRIPTION OF THE INVENTION

Figure 11:
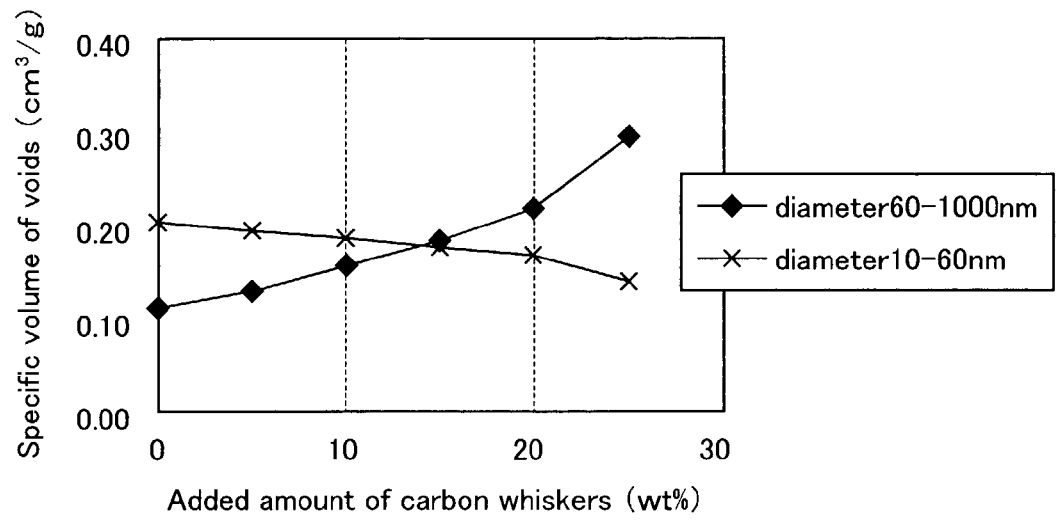
Figure 12:
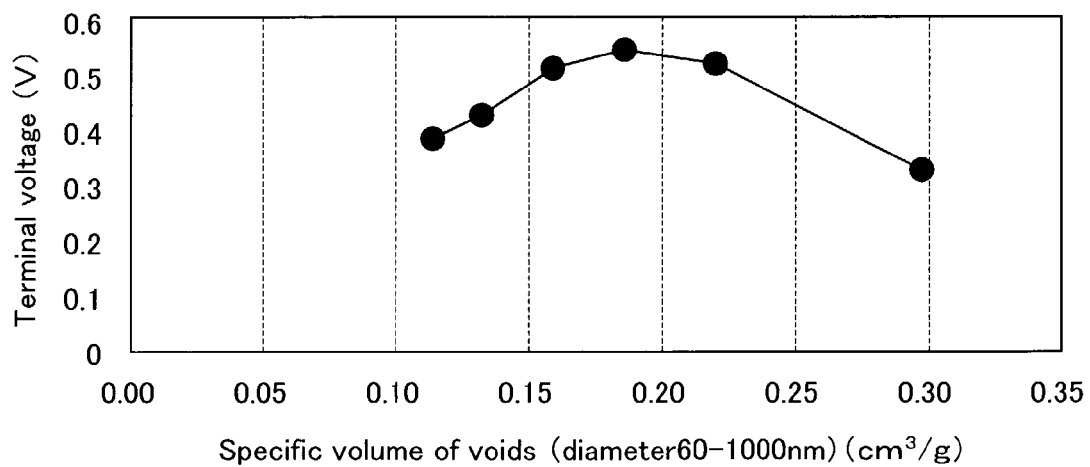

FIG. 11 is a graph showing the relationship of added amount of carbon whiskers and specific volume of voids having diameters of from 10 to 60 nm and from 60 to 1000 nm of the electrode for the polymer electrolyte fuel cell in example 2 of the present invention;

FIG. 12 is a graph showing the relationship of the specific volume of voids having diameters of from 60 to 1000 nm and a terminal voltage at $1 A/cm^2$ in current density of the electrode for the polymer electrolyte fuel cell in example 2 of the present invention.

BEST MODE FOR CARRYING OUT THE INVENTION

Next, the present invention is explained in detail by way of examples.

EXAMPLE 1

A. Primary Materials of the Catalytic Paste (I) Platinum carrying carbon
  Platinum carrying carbon particles wherein a weight ratio of carbonblack and platinum is 50:50. (trade name: TEC10E50E, produced by Tanaka Kikinzoku Kogyo K.K)
(II) Polymer electrolyte
  An ion conducting polymer (trade name: Nafion SE5112, produced by Du Pont Kabushiki Kaisha)
(III) Fibrous material
  a. Alumina borate whiskers (trade name: ALBOREX, produced by Shikoku Corporation)
  b. Carbon whiskers: a vapor grown carbon fiber; a diameter of the fiber is about 0.2 μm, length is 15 μm (VGCF: trade mark of Showa Denko K.K.)
  c. Hydrophilic cellulose fiber (trade name: KC FLOCK, produced by Nippon Paper Industries Co., Ltd.)
  d. Hydrophilic polymer water absorbing agent (trade name: ESPEC L, produced by Toyobo Co., Ltd.)

B. Preparation of Catalytic Paste

Each of a to d were added into a mixture of the platinum carrying carbon and the polymer electrolyte, and four kinds of catalytic paste were prepared. During the preparing process, several kinds of samples were made whose addition amount of the fibrous material and viscosity of the catalytic paste are different each other.

C. Preparation of Electrode Sheet

A sheet made of FEP (tetrafluoroethylene-hexafluoropropylene copolymer) was coated with the catalytic paste described above and was dried; thus an electrode sheet was obtained. The dried catalytic paste acts as the catalytic layer. The amount of Pt in the electrode sheet was $0.50 mg/cm^2$.

D. Preparation of Membrane Electrode Assembly

The electrode sheets described above were transferred onto both sides of a polymer electrolyte membrane (trade name: Nafion112, produced by Du Pont Kabushiki Kaisha) by a decal method, and a membrane electrode assembly was obtained. Transfer by a decal method means a technique in which a catalytic layer-side of an electrode sheet and a polymer electrolyte membrane are joined to each other by thermo-compression bonding, and the FEP sheet is removed after the thermo-compression bonding.

Comparative Example

An electrode sheet and a membrane electrode assembly were prepared by the same method as described above except that a fibrous material was not added in the preparation process of the catalytic paste.

Testing and the Results

Figure 1:
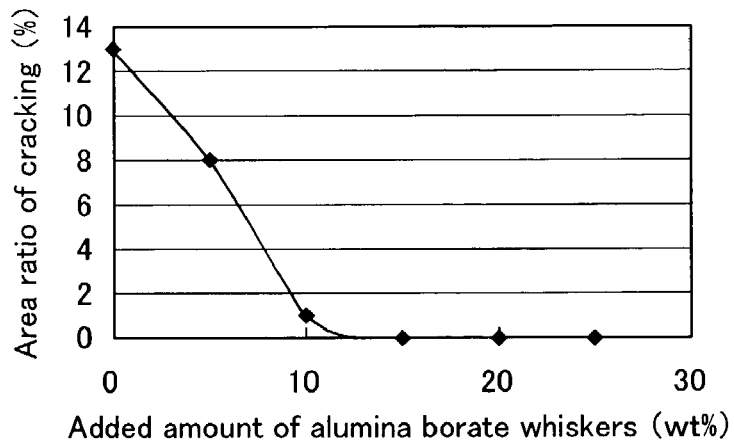
FIG. 1 is a graph showing the relationship of added amount of alumina borate whiskers and area ratio of cracking in example 1 of the present invention.
Figure 2:
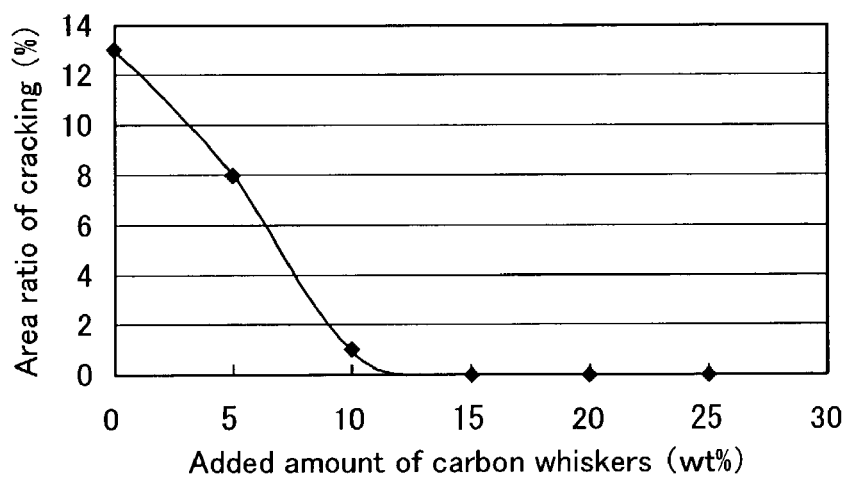
FIG. 2 is a graph showing the relationship of added amount of carbon whiskers and area ratio of cracking in example 1 of the present invention.

Observation of Cracking in the Catalytic Layer a) In the electrode sheet of the embodiment had a catalytic layer in which alumina borate whiskers were added and in the electrode sheet (viscosity is 330 cP constant) of the comparative example, conditions of cracking were observed and the area ratios of cracking in the catalytic paste was calculated. FIG. 1 shows the relationship of the area ratios of cracking and the amount of alumina borate whiskers added. As is obvious from FIG. 1, the incidence of cracking is decreased if alumina borate whiskers are added. Occurrence of cracking can be remarkably reduced if more than 10% by weight of alumina borate whiskers is added.

b) In the electrode sheet of the embodiment having a catalytic layer in which carbon whiskers were added and in the electrode sheet (viscosity is 330 cP constant) of the comparative example, conditions of cracking were observed and the area ratios of cracking in the catalytic paste were calculated. FIG. 2 shows the relationship of area ratio of cracking and the amount of carbon whiskers added. FIG. 2 shows that incidence of cracking is decreased if carbon whiskers are added. Occurrence of cracking can be remarkably reduced if more than 10% by weight of carbon whiskers is added.

Relationship of Viscosity of a Catalytic Paste and Occurrence of Cracking

Figure 3:
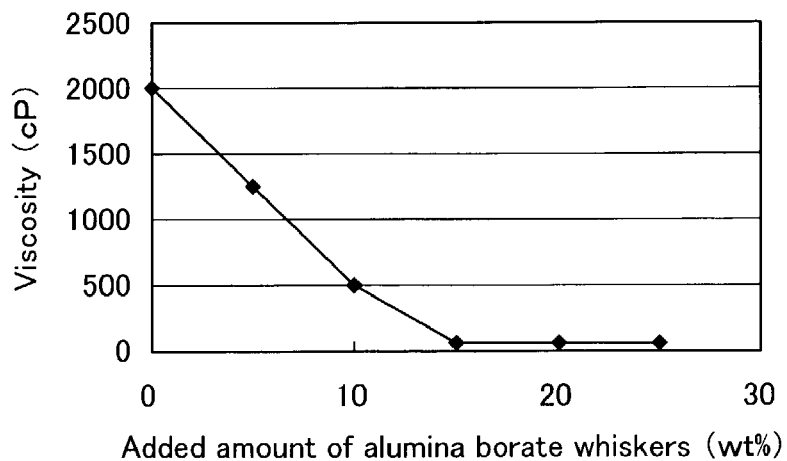
FIG. 3 is a graph showing the relationship of added amount of alumina borate whiskers and the minimum viscosity of a catalyst paste in which cracking never occurs in example 1 of the present invention.

In the electrode sheet of the embodiment having a catalytic layer in which alumina borate whiskers were added and in the electrode sheet of the comparative example, the relationship of the viscosity of the catalytic paste and occurring of cracking was investigated and the minimum viscosity at which cracking occurred was calculated. To measure the viscosity, a viscosity measuring device (trade name: DV-III+, BROOKFIELD Incorporated) was used under conditions of: spindle CPE-40, temperature 25° C., 100 rpm. FIG. 3 shows the results. If alumina borate whiskers are added, cracking tends not to occur even if the viscosity of the catalytic paste is low. That is to say, the more alumina borate whiskers added, the more the minimum viscosity of occurrence of cracking decreased. Therefore, it is obvious that the degree of freedom of viscosity of the catalytic paste is greatly increased.

Added Amount of Carbon Whiskers and Conductivity

Figure 4:
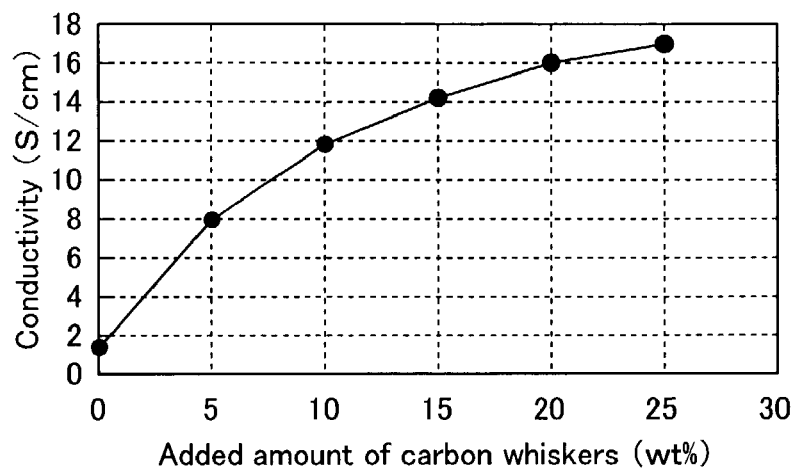
FIG. 4 is a graph showing the relationship of added amount of carbon whiskers and conductivity in example 1 of the present invention.

In a catalytic layer of the electrode sheet in which carbon whiskers were added, and in a catalytic layer of the electrode sheet of the comparative example, conductivity was tested by a direct current four-terminal method. FIG. 4 shows the results. It is obvious that conductivity is increased as the carbon whiskers are added to the catalytic layer.

Added Amount of Carbon Whiskers and Porosity

Figure 5:
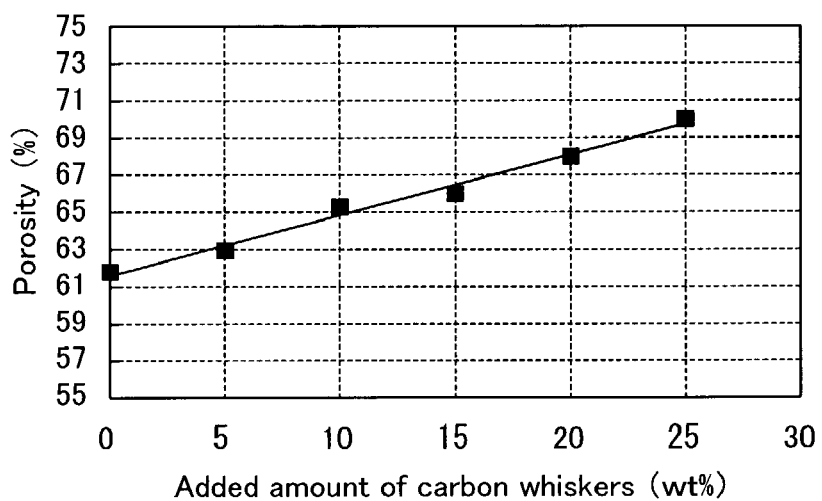
FIG. 5 is a graph showing the relationship of added amount of carbon whiskers and porosity in example 1 of the present invention.

In a catalytic layer of the electrode sheet in which carbon whiskers were added, and in a catalytic layer of the electrode sheet of the comparative example, porosity was tested by a method of mercury penetration. FIG. 5 shows the results. It is obvious that in proportion as the amount of added of carbon whiskers into the catalytic layer is increased, porosity is increased. Carbon whiskers exist entangled and form voids. Therefore, the porosity seems to be further increased, as the carbon whiskers are increased.

Added Amount of Carbon Whiskers and Critical Current Density

Figure 6:
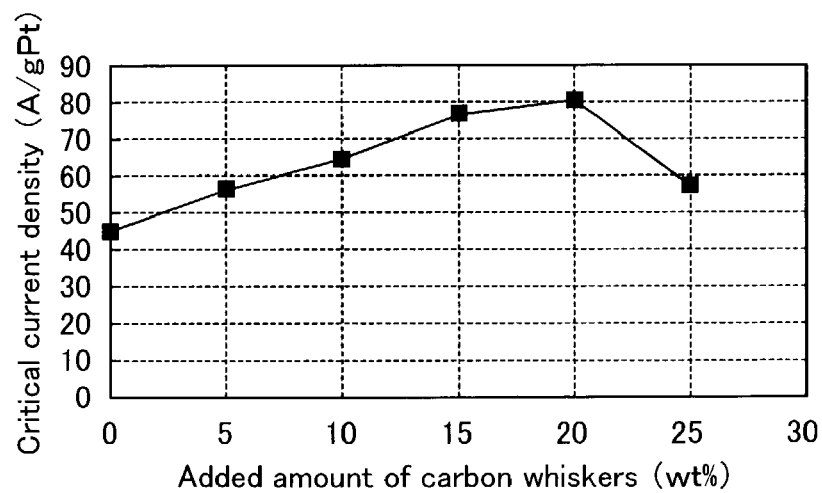
FIG. 6 is a graph showing the relationship of added amount of carbon whiskers and critical current density in example 1 of the present invention.

In a membrane electrode assembly of the embodiment including the catalytic layer in which carbon whiskers were added, and in the membrane electrode assembly of the comparative example, hydrogen gas was supplied into one of the catalytic layer as the anode, and air was supplied into the other catalytic layer as the cathode. Thus, electricity was generated and critical current density was measured. The condition of hydrogen gas and air were 80° C., humidity 50% RH, utilization ratio 50%. FIG. 6 shows the relationship of amount of carbon whiskers added into the catalytic layer and critical current density. According to FIG. 6, it is confirmed that the critical current density is increased as the amount of the carbon whiskers added is increased. However, it is suggested that the amount of addition is more than 25% by weight, generating performance is decreased. This result seems to originate from the increase in thickness of the catalytic layer.

Addition of Hydrophilic Fiber and Generating Performance

Figure 7:
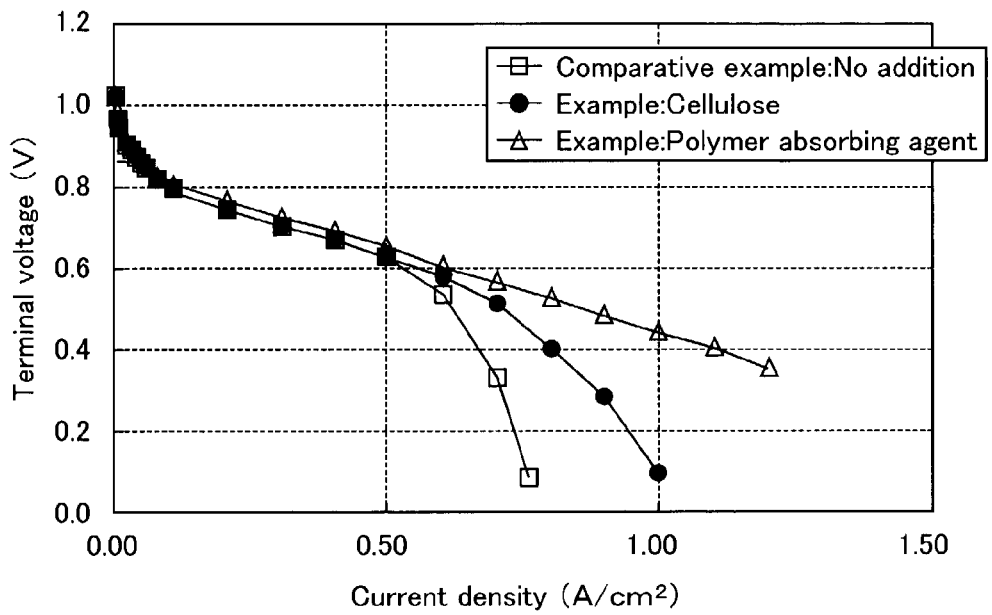
FIG. 7 is a graph showing the relationship of terminal voltage to current density and addition of hydrophilic fiber in the example 1 of the present invention.

In a membrane electrode assembly of the embodiment in which 10% by weight of cellulose was added into the catalytic layer, and in a membrane electrode assembly of the embodiment in which 10% by weight of polymer water absorbing member was added into the catalytic layer, and in a membrane electrode assembly of the comparative example, hydrogen gas was supplied into one side of the catalytic layer as the anode, and air was supplied into the other side of the catalytic layer as the cathode, and thus generating performance was tested by measuring voltage at the terminals. Hydrogen gas was supplied in the conditions of temperature 80° C., humidity 25% RH, utilization ratio 50%. Air was supplied in the conditions of temperature 80° C., humidity 45% RH, utilization rate 50%. FIG. 7 shows the results, and it was confirmed that generating performance is increased by addition of hydrophilic fibrous material.

Figure 8:
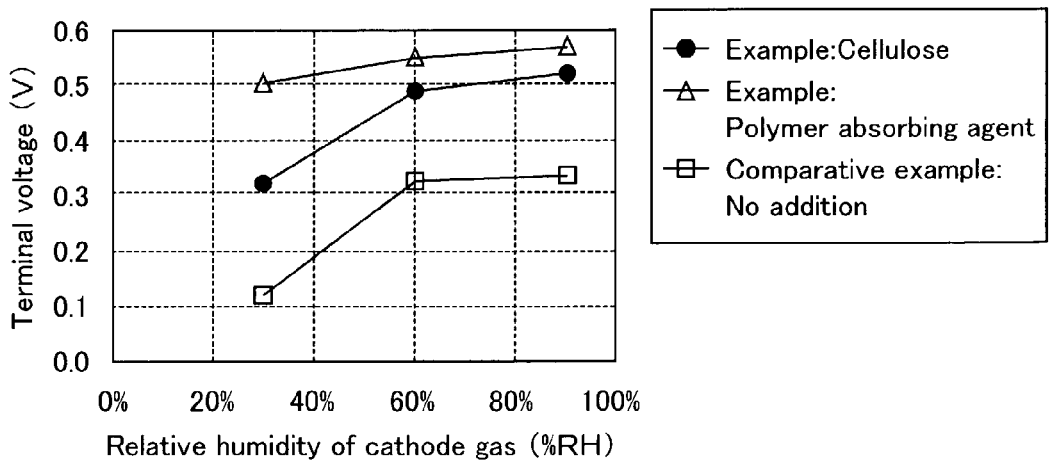
FIG. 8 is a graph showing the relationship of terminal voltage to amount of water vapor permeability and addition of hydrophilic fiber in example 1 of the present invention.

Terminal Voltage to Addition of Hydrophilic Fiber and Amount of Water Vapor Permeability of Cathode Gas In a membrane electrode assembly of the embodiment in which 10% by weight of cellulose was added into the catalytic layer, in a membrane electrode assembly of the embodiment in which 10% by weight of polymer water absorbing member was added into the catalytic layer, and in a membrane electrode assembly of the comparative example, hydrogen gas was supplied into one side of the catalytic layer as the anode, and air was supplied into the other side of the catalytic layer as the cathode, and thus terminal voltage at a relative humidity in conditions of 0.7 $A/cm^2$ by current density was measured. Hydrogen gas and air were supplied in the same conditions as "Addition of hydrophilic fiber and generating performance" described above. FIG. 8 shows the results, and it was confirmed that voltage is suddenly decreased as relative humidity is decreased when the hydrophilic fiber is not added, and deterioration of voltage is prevented even if relative humidity is low by adding the hydrophilic fiber. In particular, addition of the polymer water absorbing member yields the effect. Cellulose is less effective compared to the polymer water absorbing member. This is because cellulose fibers have relatively shorter length from 2 to 5 by aspect ratio, and has only a small ability to transfer water from a wet part to a dry part.

EXAMPLE 2

Samples From 1 to 6

100 g of ion conducting polymer solution (trade name: Nafion SE5112, produce by Du Pont Kabushiki Kaisha), 27.4 g of 10% nitric acid solution of $[Pt(NO_2)_2(NH_3)_2]$ as a catalytic precursor, 5.0 g of carbon particle (Ketienblack EC), and carbon whiskers as a void forming agent (VGCF: trademark of Showa Denko K.K.) were mixed together, and an ethanol solution as a reducing agent was added. Pt was deposited and several kinds of catalytic paste having different amounts of carbon whiskers added thereto were prepared.

Next, a sheet made of tetrofluoroethylene-hexafluoropropylene copolymer (FEP) was coated with the catalytic paste described above and was dried, and thus an electrode sheet in which the thickness of the catalytic layer was 20 μm was prepared. The amount of Pt applied in this electrode sheet was 0.30 mg/cm$^2$. Next, the electrode sheet was transferred to both sides of the polymer electrolyte membrane (trade name: Nafion 112, produced by Du Pont Kabushiki Kaisha) by a decal method, and thus membrane electrode assemblies of samples 1 to 6 were prepared. Transfer by a decal method means a technique in which an electrode sheet and a polymer electrolyte membrane are joined to each other by thermo-compression bonding, and the FEP sheet is removed after the thermo-compression bonding.

Added Amount of Carbon Whiskers and Porosity

Figure 9:
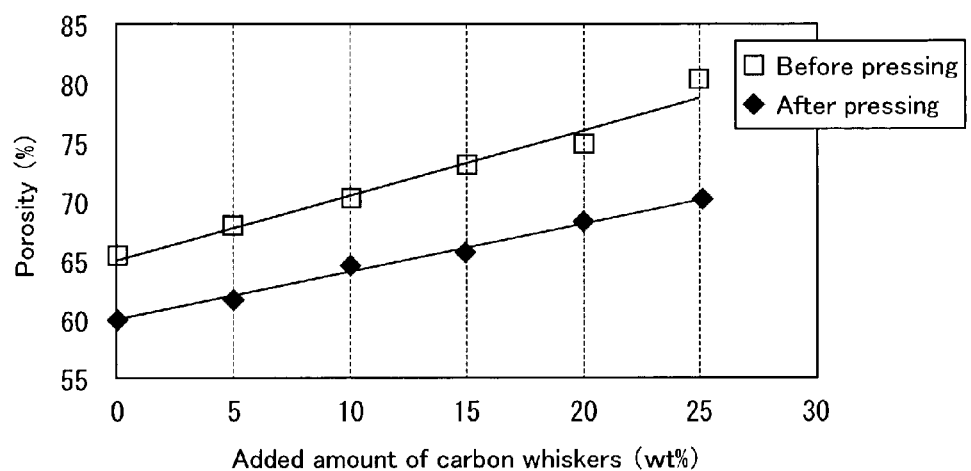
FIG. 9 is a graph showing the relationship of added amount of carbon whiskers and porosity of the catalytic layer of the electrode of the polymer electrolyte fuel cell in example 2 of the present invention.

Porosity of catalytic layers was tested by a method of mercury penetration in a catalytic layer of an electrode sheet in each of the samples from 1 to 6. Furthermore, porosity of the catalytic layer was tested in the same way after pressing processing of these electrode sheets was performed. FIG. 9 shows the results.

It is obvious from FIG. 9, that porosity of the catalytic layer increases as the amount of carbon whiskers added is increased, both after and before the pressing process. Added carbon whiskers exist in an entangled state and form voids, and this is believed to increase the porosity as the amount of carbon whiskers is increased. A carbon whiskers acts as a pillar and supports a load in pressing processing, and it was confirmed that porosity of the catalytic layer after pressing processing can be controlled in a range of from 60 to 70% by controlling the amount of carbon whiskers.

Relationship of Added Amount of Carbon Whiskers and Differential Void Volume

Figure 10:
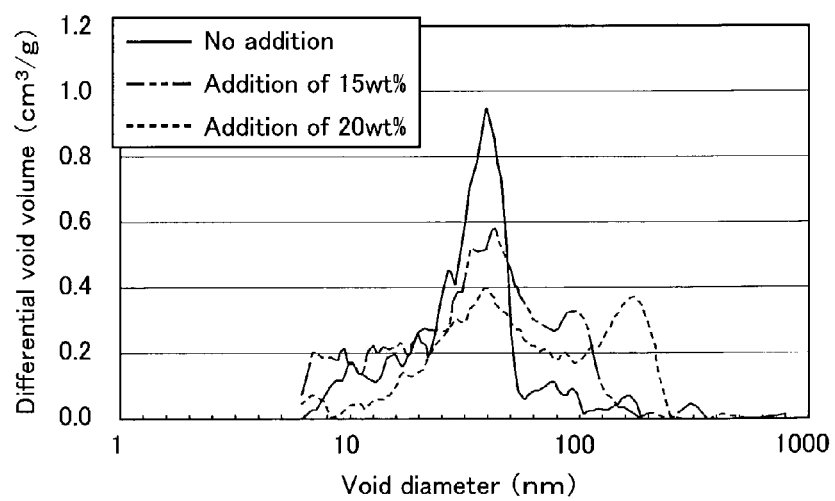
FIG. 10 is a graph showing the relationship of added amount of carbon whiskers and differential void volume of the electrode of the polymer electrolyte fuel cell in example 2 of the present invention.

Among the samples from 1 to 6, samples having a solid content ratio of added amount of carbon whiskers of 0% by weight, 10% by weight, and 15% by weight were tested regarding changing the differential void volume by a method of mercury penetration. FIG. 10 shows the results.

It is obvious from FIG. 2 that the volume of voids having a diameter of more than 60 nm suitable for reducing the concentration overvoltage is greatly increased by adding carbon whiskers; in particular, the sample of 15% by weight indicates an increased peak around 90 nm in diameter, the sample of 20% by weight exhibited an increased peak around 200 nm in diameter. In this way, the amount of voids having a specific diameter can be controlled by the added amount of carbon whiskers as a void forming agent.

Relationship of Added Amount of Carbon Whiskers and Void Volume

In the catalytic layer of the electrode in samples 1 to 6, a specific volume of voids having diameters of from 10 to 60 nm and 60 to 1000 nm in the catalytic layer are tested by a method of mercury penetration. FIG. 11 shows the results.

It is obvious that the void volume having diameters of from 10 to 60 nm remain stable regardless of the amount of carbon whiskers added, and the volume having diameters of from 60 to 1000 nm is greatly increased. Such voids having diameters of from 60 to 1000 nm function well as gas channels, and it became clear that the amount of the desirable gas channels can be controlled by the added amount of carbon whiskers as a void forming agent.

Void Volume Having Diameters of From 60 to 1000 nm and Terminal Voltage

In a membrane electrode assembly in samples 1 to 6, hydrogen gas was supplied into one side of a catalytic layer as the anode and air was supplied into the other side of the catalytic layer as the cathode, and thus terminal voltage to a void specific volume at 1A/cm$^2$ in current density was measured. Hydrogen gas was supplied in the conditions of temperature 80° C., humidity 25% RH, and utilization ratio 50%. Air was supplied in the conditions of temperature 80° C., humidity 45% RH, and utilization ratio 50%. FIG. 12 shows the results.

As is obvious from FIG. 12, terminal voltage at 1A/cm$^2$ in current density indicates a high value in a case in which the specific volume of voids having diameters of from 60 to 1000 nm is in a range of from 0.15 to 0.25 cm$^3$/g. Therefore, it is confirmed to be favorable for void volume having diameters of from 60 to 1000 nm in the catalytic layer to be in a range of from 0.15 to 0.25 cm$^3$/g for the electrode of polymer electrolyte fuel cell of the present invention.

As explained above, the polymer electrolyte fuel cell of the present invention can yield an effect that bonding strength of the catalytic layer is improved and the occurring of cracking is prevented without adding a bonding agent or addition of only a small amount thereof because a fibrous material is included in the catalytic layer.

In the present invention, void volume having diameters of from 60 to 1000 nm can be prepared in a range of from 0.15 to 0.25 cm$^3$/g without applying complicated processing by using a fibrous material such as carbon whiskers as a void forming agent in the catalytic layer comprising a catalytic material, an ion conducting material, an electron conducting material, and the void forming agent. As a result, improvement of power generation efficiency is achieved.

What is claimed is:

1. An electrode for a polymer electrolyte fuel cell, comprising:
   a catalytic layer including a catalyst material;
   an ion conducting material;
   an electron conducting material; and
   a void forming agent;
   wherein voids having diameters from 60 to 1000 nm have a volume of from 0.15 to 0.25 cm$^3$/g;
   wherein the catalyst material, the ion conducting material, the electron conducting material and the void forming agent form a mixture;
   wherein the catalytic layer contains a void forming agent in a range of from 5 to 25% by weight; and
   wherein the void forming agent is composed of fine fibers having diameters of 0.4 μm or less.

2. The electrode for a polymer electrolyte fuel cell according to claim 1, wherein the volume of the voids is in a range of from 0.17 to 0.22 cm$^3$/g.

3. The electrode for a polymer electrolyte fuel cell according to claim 1, wherein the fibers are carbon whiskers.

4. The electrode for a polymer electrolyte fuel cell according to claim 1, wherein the electrode is in a polymer electrolyte fuel cell.

5. The electrode for a polymer electrolyte fuel cell according to claim 1, wherein the catalyst material, the polymer electrolyte, and the fibrous material are dispersed uniformly.

6. The electrode for a polymer electrolyte fuel cell according to claim 1, wherein catalyst material which is diffused into the ion conducting material is in a range of from 1 to 80% by weight of the entirety of catalytic material contained in the electrode.

* * * * *